United States Patent

Egusa et al.

[11] Patent Number: 6,118,983
[45] Date of Patent: *Sep. 12, 2000

[54] CDMA COMMUNICATION SYSTEM CAPABLE OF CONTROLLING TRANSMISSION POWER IN EACH BASE STATION WITHOUT INTERFERENCE

[75] Inventors: Ryoichi Egusa; Masahiko Yahagi, both of Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/903,377

[22] Filed: Jul. 30, 1997

[30] Foreign Application Priority Data

Jul. 31, 1996 [JP] Japan .................................... 8-201946

[51] Int. Cl.⁷ .............................. H04B 1/00; H04B 17/00
[52] U.S. Cl. ........................... 455/69; 455/67.1; 455/561
[58] Field of Search ................................. 455/38.3, 67.1, 455/67.3, 68–69, 403, 501, 550, 561, 574, 522; 370/335, 342, 441

[56] References Cited

U.S. PATENT DOCUMENTS

| | | | |
|---|---|---|---|
| 5,566,165 | 10/1996 | Sawahashi et al. | 455/38.3 |
| 5,590,409 | 12/1996 | Sawahashi et al. | 455/522 |
| 5,603,096 | 2/1997 | Gilhousen et al. | 455/522 |
| 5,623,486 | 4/1997 | Dohi et al. | 455/38.3 |
| 5,629,934 | 5/1997 | Ghosh et al. | 455/38.3 |
| 5,675,629 | 10/1997 | Raffel et al. | 455/561 |
| 5,752,197 | 5/1998 | Rautiola | 455/522 |
| 5,794,129 | 8/1998 | Komatsu | 455/69 |
| 5,822,318 | 10/1998 | Tiedemann, Jr. et al. | 455/403 |
| 5,822,362 | 10/1998 | Friedmann | 455/522 |
| 5,884,187 | 3/1999 | Ziv et al. | 455/69 |

OTHER PUBLICATIONS

"An Overview of the Application of Code Division Multiple Access (CDMA) to Digital Cellular Systems and Personal Cellular Networks", Qualcomm Inc., May (1992), pp. iii–vi, 1–58.

TIA/EIA/Interim Standard Mobile Station–Base Station Compatibility Standard for Dual–Mode Wideband Spread Spectrum Cellular System (May) 1995, pp. 6–230 and 6–231.

*Primary Examiner*—Curtis A. Kuntz
*Assistant Examiner*—George Eng
*Attorney, Agent, or Firm*—Foley & Lardner

[57] ABSTRACT

In a communication system of a CDMA type used in a base station to control transmission power sent to a mobile station through a forward channel, a base station controller controls transmission power of a plurality of base station transceivers by monitoring channel reception quality information sent from each of the mobile stations which are communicating with the base station and by reducing the transmission power in each of the transceivers with reference to total or average transmission power of the base station.

18 Claims, 5 Drawing Sheets

FIG. 7

CDMA COMMUNICATION SYSTEM CAPABLE OF CONTROLLING TRANSMISSION POWER IN EACH BASE STATION WITHOUT INTERFERENCE

BACKGROUND OF THE INVENTION

This invention relates to a communication system of a code division multiple access (CDMA) type which is capable of carrying out bidirectional communication and which uses a spread spectrum technique and to a base station used in the CDMA communication system which will be simply called a CDMA system hereinunder.

A conventional CDMA system has been proposed in "AN OVERVIEW OF THE APPLICATION OF CODE DIVISION MULTIPLE ACCESS (CDMA) TO DIGITAL CELLULAR SYSTEMS AND PERSONAL CELLULAR NETWORKS" (May 21, 1992) published by QUALCOMM Incorporated and "TIA/EIA INTERIM STANDARD Mobile Station-Base Station Compatibility Standard for Dual-Mode Wideband Spread Spectrum Cellular System TIA/EIA/IS-95-A (Revision of TIA/EIA/IS-95), May 1995.

In a conventional CDMA system of the type described, a plurality of base stations are spaced apart from one another to define service areas and bidirectionally communicable with a plurality of mobile stations. In other words, bidirectional communication can be made between the base stations and the mobile stations.

In such a CDMA system, the base station forwardly communicates with each mobile station in a service area through a forward or downward channel while each mobile station reversely communicates with the base station or stations through a reverse or backward channel. Herein, it is assumed with the instant specification that the forward and the backward channels are assigned to each mobile station and that the base station has a plurality of transceivers which include transmitter and receiver sections to carry out transmission and reception operations between each transceiver and the mobile station further assigned thereto.

Under the circumstances, an original digital signal, such as an audio or an image data signal, is multiplied by a pseudo random noise or number (PN) code in the transmitter section of the base station to be sent through the forward channel. By such multiplication, the original data signal which has a narrow bandwidth is spread in spectrum into a spread signal of a wide bandwidth. The spread signal is wider in bandwidth than the original data signal. Such a spread signal is subjected to modulation, such as QPSK or the like, and is thereafter transmitted as a forward radio signal through the forward channel to a receiver of each mobile station to be received as a reception signal.

In the receiver of the mobile station, a correlation is calculated between the reception signal and a pseudo random noise (PN) code which is identical with the PN code used in the transmitter. As a result, the reception signal is despread in spectrum to reproduce the original digital data signal.

Herein, it is assumed in the receiver that use is made of a PN code which is different from the PN code used for spreading the spectrum in the transmitter. In this event, the reception signal appears as a wide band noise on despreading and demodulating the reception signal by the use of such a different PN code.

Taking the above into consideration, it will be readily understood that the original digital data signal alone is extracted from the reception signal when the same PN code is used in the transmitter section of the base station and the receiver of the mobile station.

As mentioned before, a plurality of transceivers are included in each base station to define a plurality of channels which are assumed to be determined by a plurality of PN codes. Thus, when the PN codes are assigned to the channels, the original digital data signals can be separated from one another at every one of the channels without any interference, on the condition that mutual correlations among the PN codes assigned to adjacent ones of the channels become sufficiently small. Thus, code division multiple access (CDMA) can be accomplished in the above-mentioned structure and manner.

As mentioned before, it is noted that multiple access is achieved by code division in the CDMA system and that a plurality of base stations share a common frequency band in a forward link, which differs from a frequency division multiple access (FDMA) system and a time division multiple access (TDMA) system. In addition, each mobile station often communicates with a plurality of the base stations in the CDMA system through the forward and the backward channels assigned thereto, as mentioned before.

In the CDMA system, transmission power should be strictly controlled not only at every one of the base stations but also at every one of the transceivers of each base station. This is because interference among the base stations takes place in each mobile station in dependency upon the electric power of each base station. Specifically, when the transmission power is increased in a certain one of the base stations in comparison with the transmission power in the other base stations, such an increase of the transmission power adversely affects radio signals sent from the other base stations and results in interference in each mobile station.

In order to avoid such interference, a capacity of subscribers is determined in the CDMA system on condition that a signal-to-noise (S/N) ratio in each mobile station exceeds a predetermined reference level. The capacity of subscribers becomes small, if a noise is comparatively large. Otherwise, the capacity of subscribers can be increased.

Taking the above into account, the capacity of subscribers is increased by adjusting or controlling the transmission power of each of the base stations in the CDMA system in consideration of communication quality and interference in each mobile station.

At any rate, the transmission power must be controlled in each of the base stations so as to reduce a rate of the interference on the other mobile stations. To this end, a transmission power control unit is included in each of the base stations used in the conventional CDMA system. Specifically, the transmission power on the side of each base station is controlled on the basis of a reception quality factor detected by each mobile station. With this structure, each base station controls the transmission power with reference to the reception quality factor sent from each mobile station so that speech quality is kept appropriate in each mobile station.

However, the transmission power control unit is not always effective to adjust the transmission power in each of the base stations included in the CDMA system. More specifically, it is assumed that first and second base stations are located which have service areas adjacent to each other and that first and second mobile stations run within the first and the second service areas, respectively. Herein, it is further assumed that the first and the second mobile stations communicate with the first and the second base stations through forward links, respectively, but are located at positions influenced by transmission signals sent from the second and the first base stations, respectively.

Under the circumstances, let a reception quality factor in the first mobile station be reduced at a forward channel due to movement of the first mobile station or the like. The first mobile station notifies the first base station of a reduction of the reception quality factor by using a power measurement message. Responsive to the power measurement message, the first base station detects the reduction of the reception quality factor in the first mobile station. After detection, the first base station augments transmission power for the first mobile station so as to improve the reception quality factor of the first mobile station. As a result, the reception quality factor is improved in the first mobile station.

On the other hand, it should be recollected that a transmission signal or a spread signal has a very wide bandwidth in the CDMA system because the spread spectrum CDMA technique is used, as mentioned before. Therefore, augmentation of the transmission power in the first base station brings about an increase of a wide band noise component at the second mobile station which is located at the position influenced by the first base station. This means that a reception quality factor is decreased in the second mobile station because the reception signal to wide band noise ratio becomes small with an increase of the transmission power in the first base station.

A decrease of the reception quality factor in the second mobile station is transmitted by the use of the power measurement message to the second base station. Supplied with the power measurement message, the second base station detects the decrease of the reception quality factor in the second mobile station and augments the transmission power for the second mobile station. Such augmentation of the transmission power serves to improve the reception quality factor in the second mobile station.

This results in a reduction of the reception quality factor in the first mobile station, as already mentioned above.

Thus, the augmentation of the transmission power is alternately repeated in the first and the second base stations until each of the first and the second base stations reaches maximum transmission power. Such a phenomenon may be referred to as a feedback phenomenon. Eventually, the reception quality factors are not improved in the first and the second mobile stations.

Practically, a similar feedback phenomenon also takes place in a single base station when the single base station communicates with a plurality of mobile stations by the use of a plurality of transceivers included in each base station.

From the above, it is readily understood that a reduction of the reception quality factor in a certain mobile station is successively spread or propagated over adjacent ones of the service areas and that the reception quality factor is degraded over a whole of the CDMA system.

Consequently, a reduction takes place as regards the capacity of subscribers and the number of the mobile stations. As a result, it is found out that a radio source which is composed of a set of radio frequencies is not always effectively utilized in the CDMA system.

SUMMARY OF THE INVENTION

It is an object of this invention to provide a communication system which is capable of preventing a reduction of a reception quality factor in each mobile station.

It is another object of this invention to provide a communication system of the type described, which is capable of preventing the reduction of the reception quality factor in each mobile station from being spread into the other mobile stations.

It is still another object of this invention to provide a communication system of the type described, which is capable of improving transmission efficiency.

It is another object of this invention to provide a transmission power control system which is suitable for a CDMA system.

It is yet another object of this invention to provide a base station which is capable of controlling transmission power without giving any influence to the other mobile stations.

In the conventional CDMA system, each of the mobile stations individually reports a measurement message to a base station while each base station individually controls transmission power of each mobile station independently of the other mobile stations. In other words, transmission power is individually controlled in each base station without systematically controlling a whole of the base stations. It has been found out that such unsystematic control of transmission power in each base station gives rise to the above-mentioned feedback phenomenon which is not converged.

A base station to which this invention is applicable is for use in a code division multiple access (CDMA) system to communicate with a plurality of mobile stations through forward and backward channels both of which are specific to the plurality of the mobile stations. According to an aspect of this invention, the base station comprises a plurality of transceivers each of which comprises a transmitter section for transmitting an output signal through the forward channel in a controllable gain value which determines transmission power and a receiver section for receiving, through the backward channel, an input signal which includes forward channel reception quality information representative of a reception quality of the forward channel. The base station further comprises base station control means, coupled in common to the plurality of the transceivers, for controlling the controllable gain values in response to the forward channel reception quality information sent from the plurality of the mobile stations so that the transmission power for each mobile station does not adversely affect the transmission power of the remaining mobile stations. In this event, the base station control means controls the controllable gain values in the plurality of the transmitter sections so that the transmission power sent from the plurality of the transceivers is reduced in total. Alternatively, the base station control means controls the transmission power of each transmitter section on the basis of at least one of the controllable gain values and the forward channel reception quality information.

According to another aspect of this invention, a base station comprises a transmitter section for transmitting an output signal through the forward channel in a controllable gain value which determines transmission power, a receiver section for receiving, through the backward channel, an input signal which includes forward channel reception quality information representative of a reception quality of the forward channel measured by the mobile station, and base station control means for controlling the controllable gain value in response to the forward channel reception quality information so that the transmission power for the mobile station does not adversely affect the other channels than the forward channel specific to the mobile station.

A communication system to which this invention is applicable is for use in a plurality of base stations each of which comprises a plurality of base station transceivers. Each base station transceivers responds to an input signal and produces an output signal. According to another aspect of this invention, each base station comprises information extracting means for extracting forward channel reception quality information from the input signal, variable gain amplifying means for amplifying a transmission signal in accordance with an indicated gain value into the output signal, transmission power control means for determining the gain value on the basis of the forward channel reception quality information, and memory means for memorizing at least one of the forward channel reception quality information and the gain value to produce the at least one the forward channel reception quality information and the gain value. The base station comprises base station control means coupled to the memory means of each base station transceivers for controlling the gain value so that a selected one of an average and a total of the transmission power sent from the plurality of the transceivers is reduced. In addition, the communication system further comprises a mobile control exchange coupled to each of the base station control means included in the plurality of the base stations.

DESCRIPTION OF THE PREFERRED EMBODIMENTS

Figure 1:
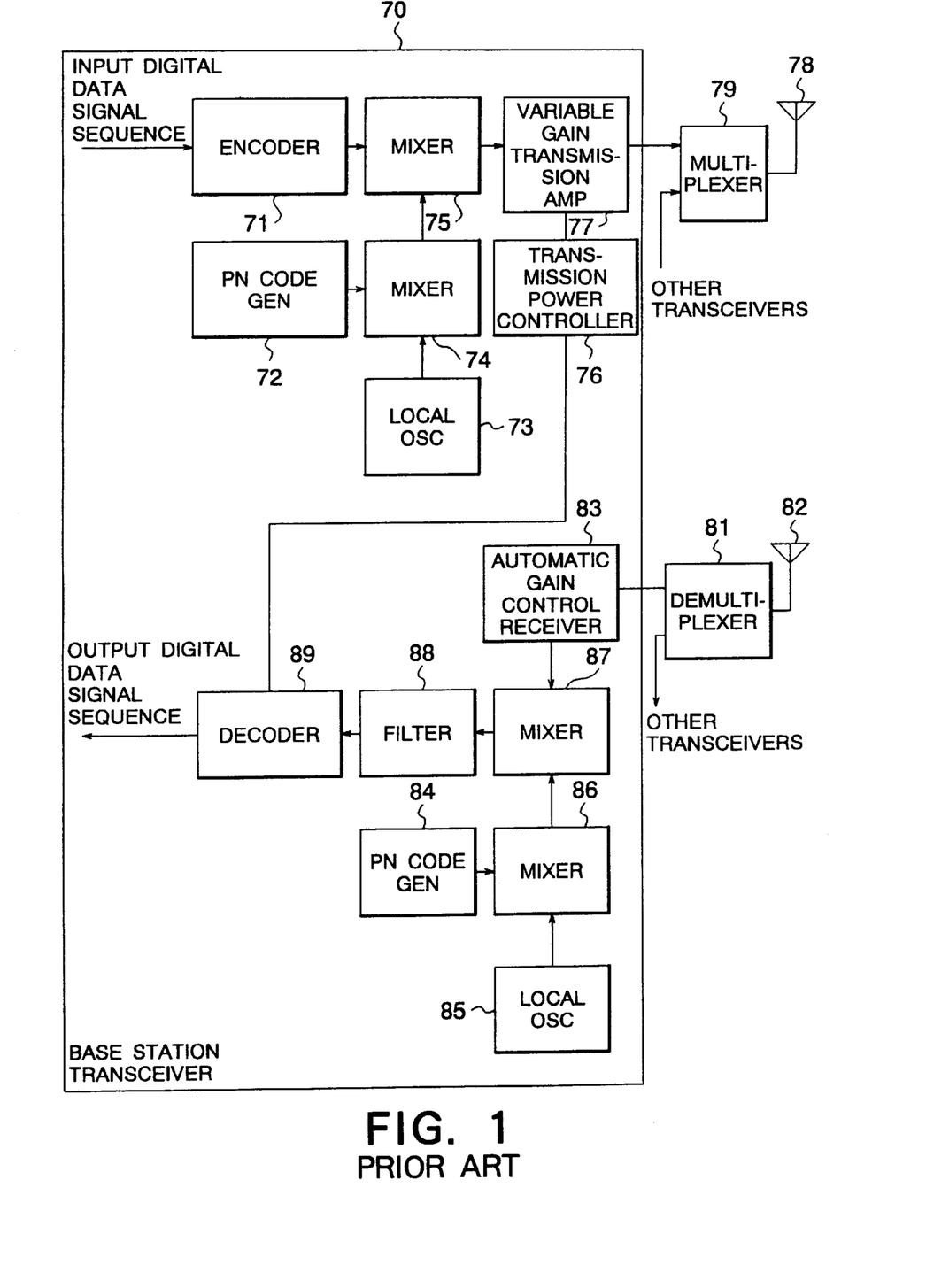
FIG. 1 shows a block diagram of a conventional communication system of a CDMA type.

Referring to FIG. 1, a conventional CDMA system includes a base station which includes a plurality of base station transceivers to define a plurality of forward and backward channels in forward and backward links, although only one base station transceiver 70 is illustrated in FIG. 1. The illustrated base station transceiver 70 communicates with a mobile station or stations present in a service area and has a transmitter section and a receiver section. It is surmised that the forward and the backward channels of the illustrated transceiver 70 are assigned to the corresponding mobile station.

Now, the transmitter section is supplied with a sequence of input digital data signals from a subscriber to produce a transmission signal and has an encoder 71, a pseudo random noise or number (PN) code generator 72, a local oscillator 73, mixers 74 and 75, a transmission power controller 76, and a variable gain transmission amplifier 77.

In the illustrated transmitter section, an output signal is sent from the variable gain transmission amplifier 77 to an antenna 78 through a multiplexer 79 which is connected to the other transceivers (not shown). The multiplexer 79 serves as a power amplifier and may be also called a common amplifier. Responsive to the input digital data signal sequence, the encoder 71 encodes the input digital data signal sequence into a sequence of encoded signals which is sent to the mixer 75.

The PN code generator 72 generates a predetermined PN code which is given to the mixer 74 which is supplied with a local frequency signal of a preselected local frequency from the local oscillator 73. The mixer 74 mixes the predetermined PN code with the local frequency signal to produce a mixed signal.

Thus, the mixer 75 is supplied with the mixed signal and the encoded signal sequence from the mixer 74 and the encoder 71 to multiply the mixed signal by the encoded signal sequence and to modulate the encoded signal sequence by the mixed signal into a modulated signal sequence. The variable gain transmission amplifier 77 amplifies the modulated signal sequence into an amplified signal in response to a gain determined by the transmission power controller 76. The amplified signal is sent to the multiplexer 79 to be combined with the signals sent from the other transceivers. The multiplexer 79 amplifies the combined signal at a constant gain and sends an amplified combined signal to the antenna 78. As a result, the amplified combined signal is transmitted through the forward channel in the form of a radio signal.

On the other hand, the receiver section is given a sequence of radio signals through a reverse or backward link from a mobile station or stations to produce a sequence of output digital data signals. In the illustrated example, the radio signal sequence is sent to a demultiplexer 81 through an antenna 82. The illustrated demultiplexer 81 is also connected to the other transceivers (not shown in this figure) included in the base station.

Specifically, the receiver section comprises an automatic gain control receiver 83, a pseudo random noise (PN) code generator 84, a local oscillator 85, mixers 86 and 87, a filter 88, and a decoder 89. More specifically, the radio reception signal is given through the backward link and the antenna 82 to the demultiplexer 81 as a reception signal and is delivered to the automatic gain control receiver 83 of each transceiver 70. The automatic gain control receiver 83 amplifies the reception signal into an amplified signal which has a prescribed amplitude and which is delivered to the mixer 87.

Herein, a predetermined PN code or spread code is sent from the PN code generator 84 to the mixer 86 which is given a local frequency signal of a local frequency. The predetermined PN code is multiplied by the local frequency signal in the mixer 86 to be sent to the mixer 87 as a multiplied signal. The multiplied signal is sent to the mixer 87 given the reception signal and is multiplied by the reception signal in the mixer 87 to produce a reception multiplied signal. The reception multiplied signal is given to the filter 88 to suppress a wide band noise component related to the other channel data signals and to reproduce a sequence of digital data signals sent from the mobile station.

The decoder 89 decodes the digital signal sequence into a decoded signal sequence which is produced as the output digital data signal sequence. Herein, it is to be noted that the decoder 89 is given various kinds of control messages from the corresponding mobile station and extracts a power measurement message from the control messages. The power measurement message is representative of a measurement result of electric power measured by the mobile station and is sent to the transmission power controller 76. In this event, the power measurement message includes reception quality information which is related to the forward channel and which is measured by the mobile station. The reception quality information is representative of a reception quality of the radio signal which is received by the mobile station through the forward channel. The reception quality information is delivered from the decoder 89 to the transmission power controller 76 as a part of the power measurement message.

Supplied with the reception quality information, the transmission power controller 76 evaluates the reception quality in the forward channel on the basis of the reception quality information. Specifically, when the reception quality is lower or worse than a predetermined threshold level, the transmission power controller 76 judges that a forward or downward channel quality is degraded and controls the variable gain transmission amplifier 77 so that the transmission power is increased by the variable gain transmission amplifier 77. To the contrary, when the reception quality is higher or not lower than the predetermined threshold level, the transmission power controller 76 judges that the forward channel quality is superfluous or excessive and controls the variable gain transmission amplifier 77 so that the gain of the variable gain transmission amplifier 77 is reduced to decrease the transmission power.

Thus, the transmission power is controlled on the base station side on the basis of the reception quality detected by each mobile station in the conventional base station so as to keep a communication quality of each mobile station at an appropriate communication quality and to reduce a interference ratio to the other mobile stations.

However, the output power can not be effectively controlled in the conventional communication system of the type described, as mentioned in the preamble of the instant specification.

Figure 2:
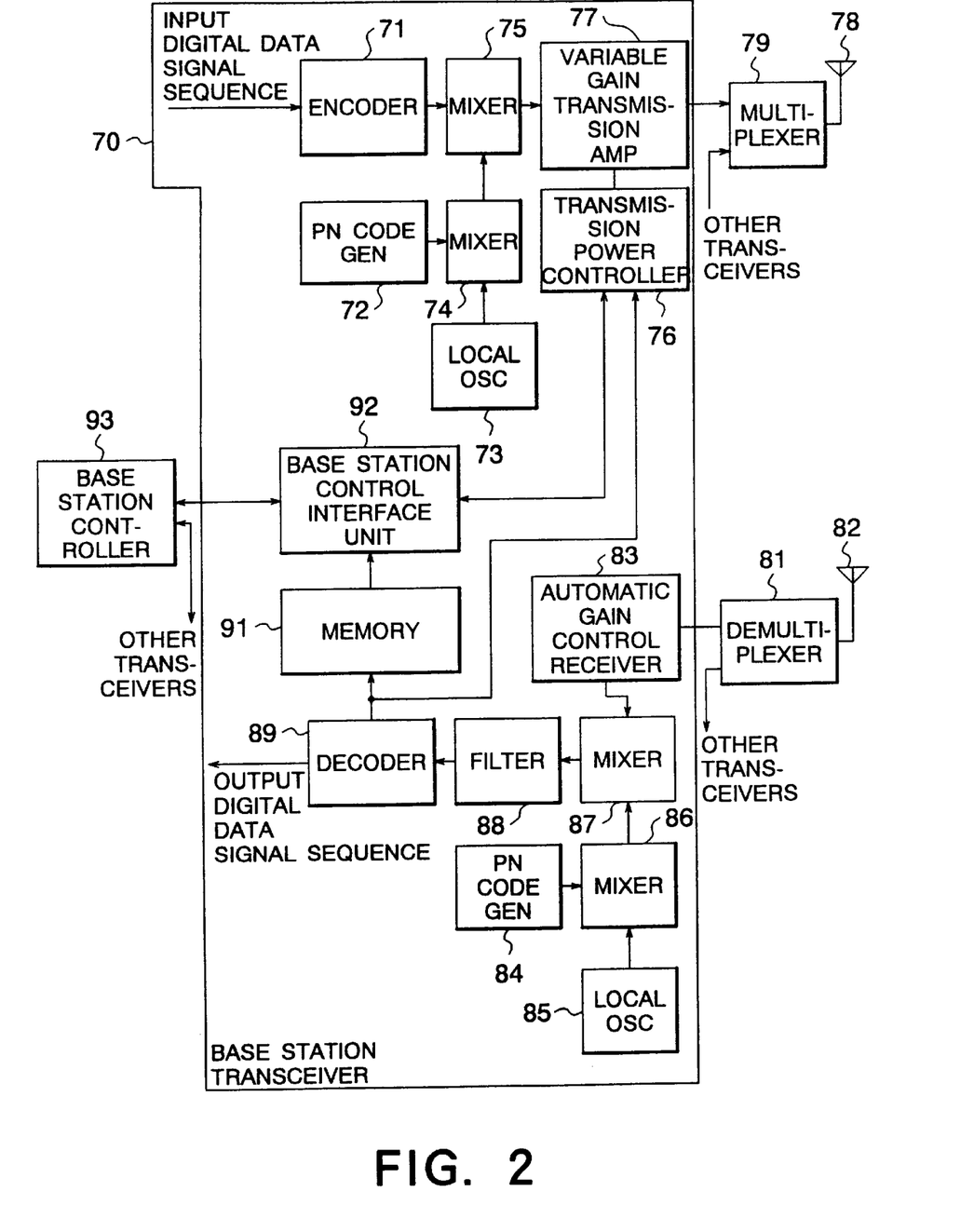
FIG. 2 shows a block diagram of a communication system according to a first embodiment of this invention, which is specified by a single base station transceiver.

Referring to FIG. 2, a CDMA system according to a first embodiment of this invention is featured by a transceiver 70 which is included in a base station and which comprises similar parts designated by like reference numerals. In FIG. 2, it is to be noted that the illustrated transceiver 70 is specified by a memory 91 connected to the decoder 89 and a base station control interface unit 92 which is coupled to both the memory 91 and the transmission power controller 76. Furthermore, the illustrated base station transceiver 70 is connected to a base station controller 93 together with the other base station transceivers (not shown).

Specifically, the base station control interface unit 92 of each base station 70 is connected to the base station controller 93 to be controlled thereby.

Figure 3:
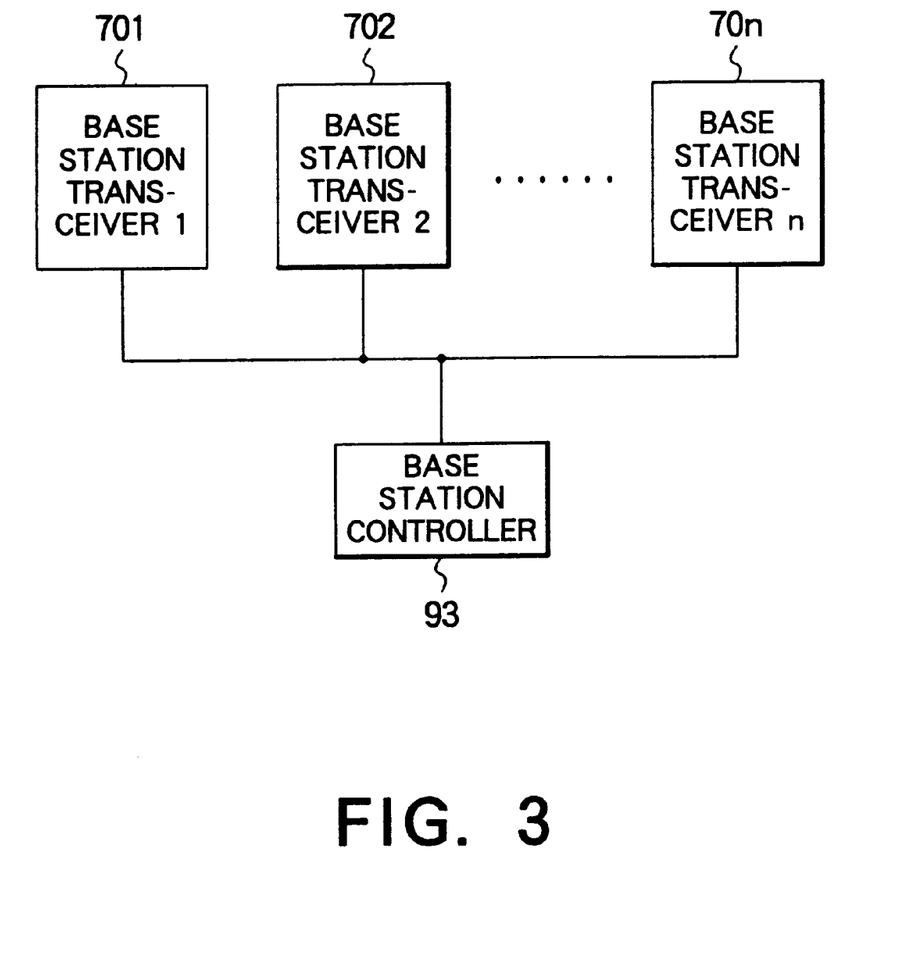
FIG. 3 shows a block diagram of an example of a base station including a plurality of base station transceivers.

Temporarily referring to FIG. 3, the illustrated base station according to this invention includes a plurality of base station transceivers, n in number, 701 to 70n which are connected to the base station controller 93 where n is an integer greater than unity. Each of the base station transceivers 701 to 70n is operable by a PN code which is different from one another and can provide a different forward channel from one another in the forward link.

Turning back to FIG. 2, the decoder 89 extracts the forward channel reception quality information from the power measurement message sent from each mobile station (not shown), like in FIG. 1. The forward channel reception quality information is sent to the transmission power controller 76 at every one of the reception signals on one hand and is stored in the memory 91 on the other hand. This means that the transmission power controller 76 is supplied with the forward channel reception quality information and sets a gain value into the variable gain transmission amplifier 77 in response to the forward channel reception quality information.

The base station controller 93 is operable in a manner to be described later. At first, the gain value set into the variable gain transmission amplifier 77 is read out of the transmission power controller 76 and sent through the base station control interface unit 92 to the base station controller 93. Similarly, each gain value is read out of the other transceivers and is sent into the base station controller 93.

Furthermore, the base station controller 93 accesses the memory 91 through the base station control interface unit 92 to read a content out of the memory 91 of each base station transceiver 70. As readily understood from the above, the content of the memory 91 is representative of the forward channel reception quality information measured by the corresponding mobile station.

In addition, the base station controller 93 controls the transmission power controller 76 through the base station control interface unit 92 in each base station transceiver 70 to renew or update the gain value set into the variable gain transmission amplifier 77 by the transmission power controller 76.

Thus, the base station controller 93 is given the forward channel reception quality information from each base station transceiver 70 and carries out transmission power control for each mobile station on the basis of the forward channel reception quality information sent from each base station transceiver 70. The other operations of the transmission section and the reception section are similar to those mentioned in conjunction with FIG. 1 and therefore will not be described any longer.

Herein, one may consider the cases where the power measurement message is transmitted from each mobile station to the base station. At first, each mobile station periodically informs the base station or stations of the number of received data frames and the number of false data frames when the number of the received data frames reaches to a predetermined number. Each mobile station also informs the base station or stations of the number of received data frames and false data frames when the number of the false data frames is counted to a preselected threshold number.

As mentioned before, the power measurement message includes the forward channel reception quality information which further includes the number of frame errors and receives frames measured in each mobile station through the forward channel together with pilot signal strength information concerned with one or more base stations simultaneously communicating with each mobile station. The pilot signal strength information is representative of reception strength of the pilot signal or signals received by each mobile station and is concerned with a relative distance between each mobile station and each base station and with interference from a plurality of the base stations which surround each mobile station.

In this event, the memory 91 is practically loaded as the forward channel reception quality information with the number of the frame errors and the number of the received frames.

In the illustrated example, the transmission power controller 76 is given the power measurement message from the decoder 89 like in the conventional base station transceiver shown in FIG. 1. Responsive to the power measurement message, the transmission power controller 76 renews the gain of the variable gain transmission amplifier 77 to control the transmission power of the base station. Such transmission power control is carried out independently of each of the base station transceivers 70. It is to be noted that the transmission power control is divided into first processing which is executed when the mobile station communicates with a single one of the base stations and second processing which is executed when it communicates with a plurality of the base stations. The first processing is somewhat different from the second processing.

Herein, description will be at first directed to the first processing carried out when the mobile station communicates with the single base station.

Let the frame error rate calculated from the forward channel reception quality information be greater than a predetermined threshold value and the forward channel be reduced in a forward channel reception quality. In this case, the forward channel quality is improved by augmenting the transmission power by a desired step width in the transmission power controller 76 to set an increased gain value into the variable gain transmission amplifier 77.

On the other hand, let the frame error rate be smaller than the predetermined threshold value. This shows that the forward channel for the mobile station has a superfluous or excessive quality. In this event, the transmission power controller 76 sets a decreased gain value into the variable gain transmission amplifier 77 to decrease the transmission power by a desired step. Alternatively, the transmission power controller 76 carries out a predetermined calculation on the basis of the pilot signal strength of the forward channel reception quality information which corresponds to its own base station. Subsequently, the transmission power controller 76 sets a calculated gain value into the variable gain transmission amplifier 77.

Subsequently, description will be made about the case where it is judged in the base station that the mobile station which communicates with the base station in question simultaneously communicates with any other base stations also.

In this case, when the frame error rate calculated from the forward channel reception quality information is lower than the desired threshold value, the base station controller 93 carries out preselected calculations on the basis of the plurality of the pilot signal strength included in the forward channel quality information to obtain a gain value for the variable gain transmission amplifier 77 of each transceiver 70. The gain value is set in the variable gain transmission amplifier 77 by the transmission power controller 76.

To the contrary, when the frame error rate calculated from the forward channel reception quality information is not lower than the desired threshold value, the base station controller 93 controls a gain value of the variable gain transmission amplifier 77 through the transmission power controller 76 so that the variable gain transmission amplifier 77 augments the output power by a step width calculated from the plurality of the pilot signal strength in the forward channel reception quality information.

On carrying out the above-mentioned operation, the base station controller 93 accesses each base station transceiver to individually control the transmission power and reads the gain values out of the variable gain transmitter amplifier 77 at a predetermined period. As a result, the gain values are sent to the base station controller 93 from the base station transceivers 70 which are communicating with the mobile station or stations.

Subsequently, the base station controller 93 sums up the gain values read out of the variable gain transmission amplifiers 77 to calculate total transmission electric power of the base station in question. When the total transmission electric power exceeds a predefined total threshold value, the base station controller 93 starts to process total transmission power control over the whole of the base station. More specifically, the base station controller 93 reads the forward channel quality information out of the memory 91 in the base station transceiver 70 which communicates with the mobile station. The base station controller 93 evaluates the readout channel reception quality information to calculate the radio quality value of each mobile station and to rank the mobile stations on the basis of the calculated radio quality values.

Herein, description will be made about an example of calculating the radio quality values (RQ) with reference to Equation 1.

$$(RQ) = \sum_{i=0}^{n} (Err\_for\ (i) \times Ffor(i)) \qquad (1)$$

In Equation 1, Err_for (0) is representative of a frame data error rate of the forward channel calculated from the newest one of the stored forward channel reception quality information related to the forward channel while Err_for(i) is representative of a frame data error rate of the forward channel calculated from the channel reception quality information which is equal to i and which is stored in the memories 91 of the base station transceivers. In addition, n is not greater than the number of the samples of the maximum forward channel reception quality information stored in the memory 91 while Ffor (i) is representative of a weighting factor for Err_for (i).

In any event, the base station controller 93 calculates the radio quality values with reference to Equation 1 to rank the radio quality values in the order of magnitudes of the radio quality values. In addition, the base station controller 93 successively selects the mobile stations from a highest one of the radio quality values. The number of the selected mobile stations is smaller than a predetermined number. The base station controller 93 calculates attenuation values of the gain values set in the variable gain transmission amplifiers 77 in connection with the base station transceivers 70 which communicate with the selected mobile stations. Subsequently, the base station controller 93 controls the transmission power controllers 76 through the base station control interface units 92 so that the transmission power is reduced by the attenuation values through the base station control interface units 92 in the base station transceivers corresponding to the respective selected mobile stations.

This brings about a reduction of the transmission power to the mobile stations selected by the base station controller 93. This means that the communication qualities are improved in unselected mobile stations and that the total transmission power can be reduced in the base station.

Figure 4:
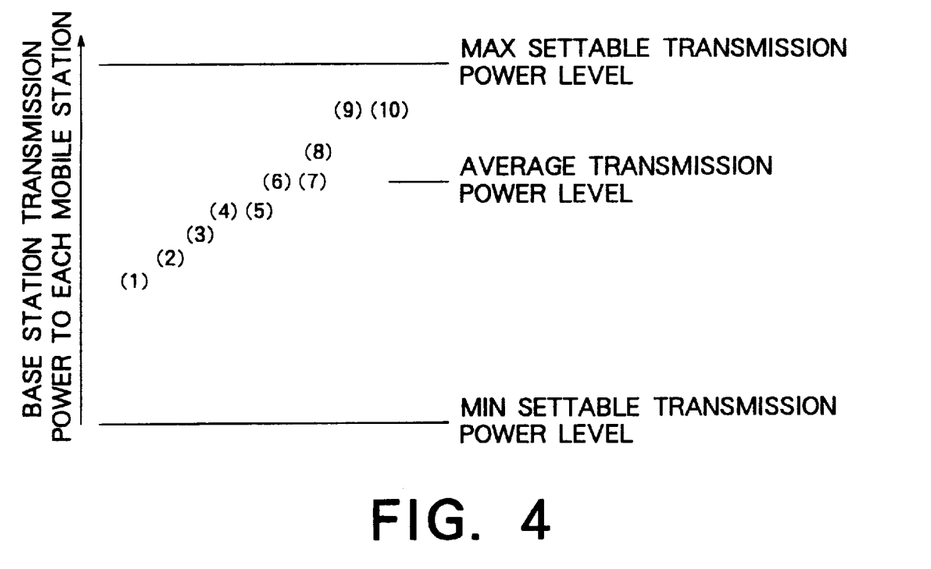
FIG. 4 shows a graphical representation of transmission power levels which are transmitted from a base station to mobile stations before transmission power control is executed in the base station.

Referring to FIG. 4, it is assumed that transmission is carried out from the base station to a plurality of the mobile stations numbered from (1) to (10) in the illustrated manner. Specifically, the mobile stations (9) and (10) are given a highest one of transmission power levels that is lower than a maximum settable transmission power level and that is higher than a second transmission power level. The mobile station (8) is given a third one of the transmission power levels that is lower than the second transmission power level. Likewise, the mobile stations (6) and (7) are given a fourth one of the transmission power levels that is lower than the third transmission power level while the mobile stations (4) and (5) are given a fifth one of the transmission power levels that is lower than the fourth transmission power level. In addition, the mobile stations (3), (2), and (1) are given sixth, seventh, and eighth ones of the transmission power levels that are lower than the fifth transmission power level and that are lowered in order. At any rate, all of the highest through the eighth transmission power levels are higher than a minimum settable transmission power level, as shown in FIG. 4.

Under the circumstances, an average transmission power level is substantially coincident with the fourth transmission power level which is given to the mobile stations (6) and (7).

Figure 5:
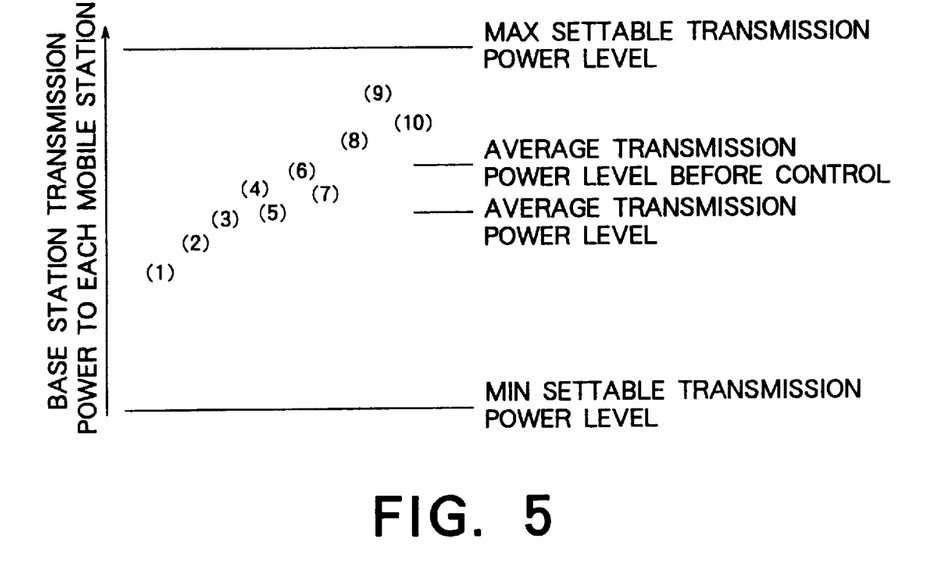
FIG. 5 shows a graphical representation of transmission power levels after the transmission power control is executed in the base station.

Referring to FIG. 5, the base station controller 93 is assumed to carry out the transmission power control in the above-mentioned manner in accordance with the transmission power levels illustrated in FIG. 4. In addition, let the average transmission power level be monitored in FIGS. 4 and 5 as the predefined threshold level instead of the total transmission power level. Herein, it is to be noted that monitoring such an average transmission power level is substantially equivalent to monitoring a total transmission power level.

In the illustrated example, the mobile stations (5), (7), and (10) are selected as the selected mobile stations to control the transmission power in the base station to attenuate the base station transmission power to the mobile stations (5), (7) and (10). The resultant average transmission power level is lowered to the sixth transmission power level, as illustrated in FIG. 5.

In the case where a certain mobile station communicates with a plurality of the base stations, the frame error rate is substantially kept constant even when a certain base station reduces the transmission power by controlling the transmission power by the use of the base station controller 93. This is because the frame error rate of the forward channel reception signal depends on a signal-to-noise (S/N) ratio in the spread spectrum communication. More specifically, when the mobile station simultaneously communicates with two base stations, the S/N ratio (S/N) in the mobile station is given by:

$$(S/N) = (Ea+Eb)/(Ea+Eb+\Sigma Na+\Sigma Nb+Netc) \quad (2)$$

In Equation 2, Ea is representative of reception power which is received by the mobile station in question and which is transmitted from the base station a to the mobile station while Eb is representative of reception power which is received by the mobile station and which is transmitted from the base station b to the mobile station. In addition, Na is representative of reception power which is received by another mobile station and which is transmitted from the base station a to another mobile station while Nb is representative of reception power which is received by another mobile station and which is transmitted from the base station b to another mobile station. Further, Netc is representative of an external noise which results from signals sent from the other base stations and a thermal noise.

In connection with Equation 2, it is assumed that the base station transmission power control is executed in the above-mentioned manner by the base station controller 93 of the base station a and that the resulting reception power Ea is reduced in the mobile station. This also results in a reduction of $\Sigma$ Na and keeps the signal-to-noise (S/N) ratio substantially invariable.

Figure 6:
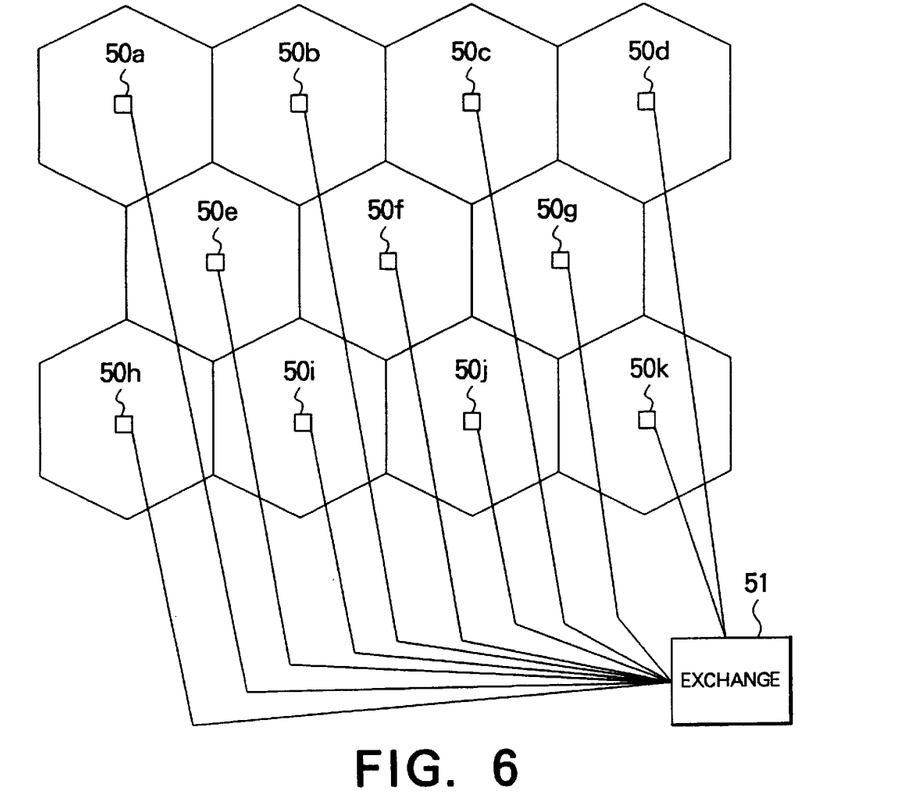
FIG. 6 shows a communication system according to a second embodiment of this invention.

Referring to FIG. 6, a tranmsmission system according to a second embodiment of this invention comprises a plurality of base stations 50a to 50k and a mobile exchange 51 connected to each of the base stations 50a to 50k and serves to carry out a base station transmission power control method in a manner similar to that-mentioned before. Herein, it is to be noted that each of the base stations 50a to 50k is similar in structure and operation to that illustrated in FIG. 2 and therefore has a base station controller 93, a memory 91, and a base station control interface unit 92 which are identical with those shown in FIG. 3. As shown in FIG. 2, it is assumed that each of the base stations 50a to 50k has a service zone of a hexagonal configuration.

In FIG. 6, description will be made about the base station transmission power control method carried out in the illustrated transmission system. Herein, it is surmised in the transmission system that base station transmission power control is carried out at a selected one of the base stations 50a to 50k that may be, for example, 50f. This means that monitoring the selected base station 50f results in base station transmission power control. Under the circumstances, the selected base station 50f notifies the mobile exchange 51 of a reduction of a radio state as a radio state message.

Supplied with the radio state message from the selected base station 50f, the mobile exchange 51 at first detects the base stations, such as 50b, 50c, 50e, 50g, 50i, and 50j, which are adjacent to the selected base station 50f so that the base station transmission power control is carried out in each of the adjacent base stations 50b, 50c, 50e, 50g, 50i, and 50j, by the use of the base station controller 93 included in each base station 50b, 50c, 50e, 50g, 50i, and 50j. Each of the adjacent base stations 50b, 50c, 50e, 50g, 50i, and 50j carries out the base station transmission power control in the manner mentioned in conjunction with FIG. 2.

In the example being illustrated, when the base station transmission power control is executed in a certain one of the base stations, similar base station transmission power control is also carried out in the base stations adjacent to the certain base station. With this structure, it is possible to wholly carry out adequate base station transmission power control over a wide range.

As mentioned before, the base station transmission power control operation is energized in the first and the second embodiments when the base station controller 93 sums up the gain values read out of the variable gain transmission amplifiers 77, so as to calculate total transmission power from the gain values and when the total transmission power exceeds the predetermined threshold level.

Alternatively, the base station transmission power control operation may be started or energized in the following conditions. At first, each base station controller 93 reads, at a predetermined period, the forward channel reception quality information out of the memories 91 of the base station transceivers 70 which correspond to a plurality of the mobile stations communicating with the base station transceivers 70. Subsequently, each base station controller 93 calculates the radio quality values in a manner mentioned in conjunction with Equation 1. Under the circumstances, the base station transmission power control is started over the whole of the base station on condition that the mobile stations of a number which is greater than a predetermined number do not satisfy the predetermined radio quality values.

On the other hand, the base station transmission power control may be energized in the following conditions. Specifically, the base station controller 93 at first reads, at a preselected period, the gain values set in the variable gain transmission amplifiers 77 of the base station transceivers 70 which are communicating with the mobile station or stations. Subsequently, the base station controller 93 calculates a distribution of gain values, namely, a gain value distribution (GVD) in accordance with Equation 3.

$$(GVD) = \sum_{i=0}^{n} (A(i) \times f(A(i))), \quad (3)$$

where i is a consecutive number assigned to the mobile stations put into a communicating state; A(i) is representative of the gain value set into the base station transceiver which communicates with an i-th one of the mobile stations; and f(x) is representative of a weighting constant which corresponds to the gain value x.

When it is judged that the gain value distribution (GVD) calculated by Equation 3 is shifted to a larger side, namely, is greater than a predefined threshold value, the base station controller 93 energizes the base station transmission control over the whole of the base station.

Furthermore, the base station transmission power control may be started over the whole of the base station in a following manner.

The base station controller 93 reads, at a prescribed period, the gain values set into the variable gain transmission amplifiers 77 of the base station transceivers 70 and detects whether or not each of the base station transceivers 70 reaches a saturation state of transmission power, namely, a state of a maximum settable transmission power level. When a predetermined number of the base station transceivers exceeds the saturation state, the base station transmission power control may be started over the whole of the base station.

In addition, the base station transmission power control may be energized when at least one of the above-mentioned conditions is satisfied.

In the first and the second embodiments, it is assumed that the mobile stations are numbered in the predetermined order from a higher one to a lower one and that transmission power is reduced only in a higher one of the mobile stations.

The mobile stations may not always be numbered but all the gain values may be attenuated by predetermined gain value with reference to the gain values set into the variable gain transmission amplifiers 77 of the base station transceivers which are communicating. With this structure, structure and processing become simple in comparison with the above-mentioned examples.

Referring back to FIG. 4, the first through the tenth mobile stations (1) to (10) are communicating with the base station, with the base station transmission power distributed in the illustrated manner. Under the circumstances, all the mobile stations (1) to (10) are controlled or reduced in transmission power without being ranked.

Figure 7:
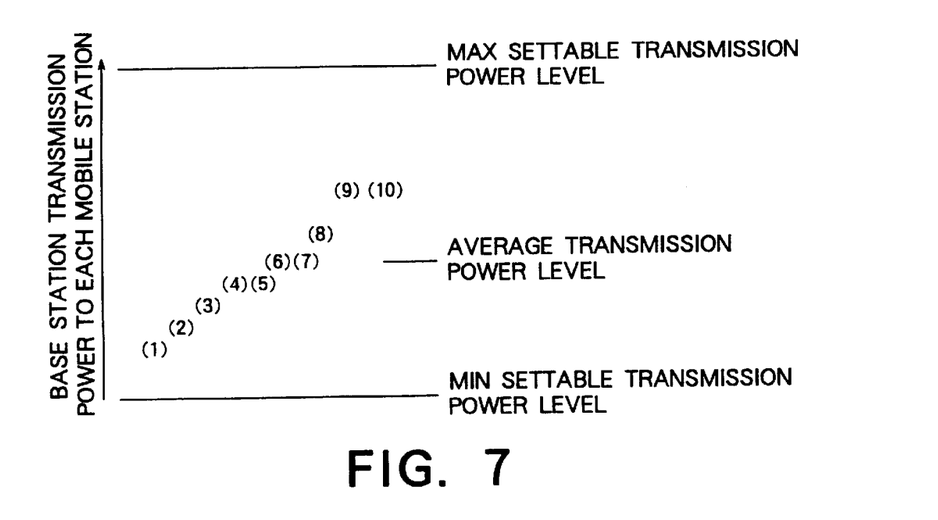
FIG. 7 shows a graphical representation of transmission power levels which are controlled in a different manner mentioned in connection with FIG. 5.

For example, the transmission power distribution shown in FIG. 4 is controlled to obtain the transmission power distribution illustrated in FIG. 7. Specifically, the transmission power is reduced under control of the base station controller 93 in all of the first through the tenth mobile stations (1) to (10) which are not ranked. The transmission power distribution of FIG. 7 has average transmission power lower than that of FIG. 4.

According to this invention, saturation and an excessive increase can be prevented in the base station transmission power delivered to each mobile station from the base station. In addition, it is possible to prevent a reduction of the forward channel reception state at each mobile station that is communicating with the base station. Moreover, a reduction of the forward channel reception state can be also accomplished in all of the other mobile stations which are communicating with the base station.

Therefore, it is possible to avoid a degradation of a quality of speech, a loss of a message, and a reduction of a quality of service, such as interruption of speech and to stably keep the number of the mobile stations which are communicable with the base station. This results in an increase of subscribers which can be accommodated in the transmission system.

While this invention has thus far been described in conjunction with a few embodiments thereof, it will be readily possible for those skilled in the art to put this invention into practice in various other manners. For example, a single base station transceiver may be controlled by the base station controller 93 to carry out transmission power control in the above-mentioned manner. In addition, various factors except the factors mentioned above may be used to control the transmission power in each base station transceiver.

What is claimed is:

1. A base station for use in a code division multiple access (CDMA) system to communicate with a plurality of mobile stations through forward and backward channels both of which are specific to the plurality of the mobile stations, said base station comprising:
   a plurality of transceivers each of which comprises:
      a transmitter section for transmitting an output signal through said forward channel in a controllable gain value which determines transmission power; and
      a receiver section for receiving, through said backward channel, an input signal which includes forward channel reception quality information representative of a reception quality of the forward channel;
   said base station comprising:
      a base station control unit, coupled in common to the plurality of the transceivers, for controlling the controllable gain values in response to said forward channel reception quality information sent from the plurality of the mobile stations so that the transmission power for each mobile station does not adversely affect the transmission power of the remaining mobile stations,
      wherein said receiver section of each transceiver is operative for extracting the forward channel reception quality information from the input signal; and said receiver section comprises a memory storage device for storing the forward channel reception quality information sent to said base station control unit.

2. A base station as claimed in claim 1, wherein said base station control units controls the controllable gain values in the plurality of the transmitter sections so that the transmission power sent from the plurality of the transceivers is reduced in total.

3. A base station as claimed in claim 1, wherein the transmitter section of each transceiver comprises:
   a variable gain amplifier for amplifying a transmission signal in accordance with the controllable gain value;
   transferring means for transferring the controllable gain value and the forward channel reception quality information from the variable gain amplifier and the memory storage device, respectively, to the base station control unit.

4. A base station as claimed in claim 3, wherein the base station control units controls the transmission power of each transmitter section on the basis of at least one of the controllable gain values and the forward channel reception quality information.

5. A base station as claimed in claim 4, wherein the base station control unit calculates a total of the transmission power in the transmitter sections on the basis of the controllable gain values and controls the variable gain amplifier so that the variable gain amplifier reduces the controllable gain values when the total of the transmission power exceeds a predetermined total value.

6. A base station as claimed in claim 4, wherein the base station control means calculates an average of the transmission power in the transmitter sections from the controllable gain values and controls the variable gain amplifying means so that the variable gain amplifying means reduce the controllable gain values when the average of the transmission power exceeds a preselected average value.

7. A base station as claimed in claim 4, wherein the base station control means calculates a gain value distribution on the basis of the controllable gain values and controls the variable gain amplifying means so that the variable gain amplifying means reduce the controllable gain values when the gain value distribution exceeds a prescribed distribution value.

8. A base station as claimed in claim 4, wherein the base station control means counts the number of the transceivers at which the controllable gain values are saturated and controls the variable gain amplifying means so that the variable gain amplifying means reduce the controllable gain values when the number exceeds a preselected number.

9. A base station as claimed in claim 4, wherein the base station control means calculates quality values of radio channels from the forward channel reception quality information sent from the mobile stations and controls the variable gain amplifying means so that the variable gain amplifying means reduce the controllable gain values when the quality values are lower than a predetermined quality value in a preselected number of the transceivers.

10. A base station as claimed in claim 9, wherein the base station control means ranks the quality values from a largest one to a smallest one and reduces the controllable gain values only in connection with a predetermined number of the transceivers successively selected from the largest one of the quality values.

11. A base station as claimed in claim 4, wherein the base station control means ranks the controllable gain values from a largest one to a smallest one and reduces the controllable gain values only in connection with a preselected number of the transceivers successively selected from the largest one of the quality values.

12. A communication system for use in a plurality of base stations each of which comprises a plurality of base station transceivers, each base station transceivers responding to an input signal and producing an output signal and comprising:
    information extracting means for extracting forward channel reception quality information from the input signal;
    a variable gain amplifier for amplifying a transmission signal in accordance with an indicated gain value into the output signal;
    a transmission power control unit for determining the gain value on the basis of the forward channel reception quality information; and
    a memory device for storing at least one of the forward channel reception quality information and the gain value to produce the at least one the forward channel reception quality information and the gain value;
    said each of the plurality of base stations comprising:
        a base station control unit coupled to said memory device of each base station transceivers for receiving at least one of the forward channel reception quality information and gain value sent from the memory device in order to control the gain value so that a selected one of an average and a total of the transmission power sent from the plurality of the transceivers is reduced.

13. A communication system as claimed in claim 12, further comprising:
    a mobile control exchange coupled to each of said base station control units included in the plurality of the base stations.

14. A communication system as claimed in claim 13, wherein each of the base station control units included in the plurality of the base stations reports a reduction of a radio state to the mobile control exchange while the mobile control exchange produces an indication such that the selected one of the average and the total of the transmission power is reduced by the base station control units of the base stations adjacent to each of the base stations.

15. A base station for use in a code division multiple access (CDMA) system to communicate with a plurality of mobile stations through forward and backward channels both of which are specific to the plurality of the mobile stations, said base station comprising:
    a plurality of transceivers each of which comprises:
        a transmitter section including a variable gain amplifier for transmitting an output signal through said forward channel with a controllable gain value which determines transmission power; and
        a receiver section for receiving, through said backward channel, an input signal which includes forward channel reception quality information representative of a reception quality of the forward channel;
    said base station further comprising:
        a base station control unit, coupled in common to the plurality of the transceivers, for controlling the controllable gain values in response to said forward channel reception quality information sent from the plurality of the mobile stations so that the transmission power for each mobile station does not adversely affect the transmission power of the remaining mobile stations,
    wherein said receiver section of each transceiver is operative for extracting the forward channel reception quality information from the input signal; and said receiver section comprises a memory storage device for storing the forward channel reception quality information sent to said base station control unit
    wherein the base station control unit calculates an average of the transmission power in the transmitter sections from the controllable gain values and controls the variable gain amplifier so that the variable gain amplifier reduces the controllable gain values when the average of the transmission power exceeds a preselected average value.

16. A base station for use in a code division multiple access (CDMA) system to communicate with a plurality of mobile stations through forward and backward channels both of which are specific to the plurality of the mobile stations, said base station comprising:
    a plurality of transceivers each of which comprises:
        a transmitter section including a variable gain amplifier for transmitting an output signal through said forward channel with a controllable gain value which determines transmission power; and
        a receiver section for receiving, through said backward channel, an input signal which includes forward channel reception quality information representative of a reception quality of the forward channel;

said base station further comprising:

a base station control unit, coupled in common to the plurality of the transceivers, for controlling the controllable gain values in response to said forward channel reception quality information sent from the plurality of the mobile stations so that the transmission power for each mobile station does not adversely affect the transmission power of the remaining mobile stations, wherein said receiver section of each transceiver is operative for extracting the forward channel reception quality information from the input signal; and said receiver section comprises a memory storage device for storing the forward channel reception quality information sent to said base station control unit wherein the base station control unit calculates a gain value distribution on the basis of the controllable gain values and controls the variable gain amplifier so that the variable gain amplifier reduces the controllable gain values when the gain value distribution exceeds a prescribed distribution value.

17. A base station for use in a code division multiple access (CDMA) system to communicate with a plurality of mobile stations through forward and backward channels both of which are specific to the plurality of the mobile stations, said base station comprising:

a plurality of transceivers each of which comprises:

a transmitter section including a variable gain amplifier for transmitting an output signal through said forward channel with a controllable gain value which determines transmission power; and a receiver section for receiving, through said backward channel, an input signal which includes forward channel reception quality information representative of a reception quality of the forward channel;

said base station further comprising:

a base station control unit, coupled in common to the plurality of the transceivers, for controlling the controllable gain values in response to said forward channel reception quality information sent from the plurality of the mobile stations so that the transmission power for each mobile station does not adversely affect the transmission power of the remaining mobile stations, wherein said receiver section of each transceiver is operative for extracting the forward channel reception quality information from the input signal; and said receiver section comprises a memory storage device for storing the forward channel reception quality information sent to said base station control unit wherein the base station control unit counts the number of the transceivers at which the controllable gain values are saturated and controls the variable gain amplifier so that the variable gain amplifier reduces the controllable gain values when the number exceeds a preselected number.

18. A base station for use in a code division multiple access (CDMA) system to communicate with a plurality of mobile stations through forward and backward channels both of which are specific to the plurality of the mobile stations, said base station comprising:

a plurality of transceivers each of which comprises:

a transmitter section including a variable gain amplifier for transmitting an output signal through said forward channel with a controllable gain value which determines transmission power; and a receiver section for receiving, through said backward channel, an input signal which includes forward channel reception quality information representative of a reception quality of the forward channel;

said base station further comprising:

a base station control unit, coupled in common to the plurality of the transceivers, for controlling the controllable gain values in response to said forward channel reception quality information sent from the plurality of the mobile stations so that the transmission power for each mobile station does not adversely affect the transmission power of the remaining mobile stations, wherein said receiver section of each transceiver is operative for extracting the forward channel reception quality information from the input signal; and said receiver section comprises a memory storage device for storing the forward channel reception quality information sent to said base station control unit wherein the base station control unit calculates quality values of radio channels from the forward channel reception quality information sent from the mobile stations and controls the variable gain amplifier so that the variable gain amplifier reduces the controllable gain values when the quality values are lower than a predetermined quality value in a preselected number of the transceivers.

* * * * *